(12) United States Patent
Verhaeghe et al.

(10) Patent No.: US 9,485,908 B2
(45) Date of Patent: Nov. 8, 2016

(54) SECONDARY CUTTING DEVICE ARRANGEMENT FOR AN AGRICULTURAL HARVESTING MACHINE

(75) Inventors: Didier O. M. Verhaeghe, Ypres (BE); Bart M. A. Missotten, Winksele (BE); Nick Hollevoet, Eernegem (BE); Steven Jonckheere, Gistel (BE); Tim Willems, Ghent (BE); Jolan Heyns, Oostkamp (BE)

(73) Assignee: CNH Industrial America LLC, New Holland, PA (US)

( * ) Notice: Subject to any disclaimer, the term of this patent is extended or adjusted under 35 U.S.C. 154(b) by 109 days.

(21) Appl. No.: 14/233,436

(22) PCT Filed: Jul. 20, 2012

(86) PCT No.: PCT/EP2012/064355
§ 371 (c)(1),
(2), (4) Date: Jul. 14, 2014

(87) PCT Pub. No.: WO2013/011140
PCT Pub. Date: Jan. 24, 2013

(65) Prior Publication Data
US 2014/0311115 A1    Oct. 23, 2014

(30) Foreign Application Priority Data
Jul. 20, 2011    (BE) .................................. 2011/0466

(51) Int. Cl.
*A01D 45/02*    (2006.01)
*A01D 34/54*    (2006.01)
(Continued)

(52) U.S. Cl.
CPC ........... *A01D 34/54* (2013.01); *A01D 34/8355* (2013.01); *A01D 47/00* (2013.01)

(58) Field of Classification Search
CPC ............. A01D 34/8355; A01D 45/02; A01D 45/021; A01D 47/00; A01B 35/16
USPC ............ 172/122, 121, 551; 56/52, 504, 503, 56/10.2 R, 238
See application file for complete search history.

(56) References Cited

U.S. PATENT DOCUMENTS 1,429,163 A * 9/1922 Peden ................. A01D 34/8355
                                                          172/551
2,401,513 A * 6/1946 Schmidt ................. A01D 47/00
                                                           56/238

(Continued)

FOREIGN PATENT DOCUMENTS

CN        2860040 Y *  1/2007 ............. A01D 45/02
CN      201414300 Y *  3/2010 ............. A01D 45/02
(Continued)

*Primary Examiner* — Árpád Fábián-Kovács
(74) *Attorney, Agent, or Firm* — Patrick M. Sheldrake

(57) ABSTRACT

An agricultural machine suitable for the harvesting of grain-like crops, comprising a header, the header comprising a first cutting device whose position is determined by the adjustable height of the header, and a second cutting device, comprising a knife drum that is rotatably mounted in a housing, which via rollers or equivalent supports can move over the ground at different heights of the header, and wherein the housing of the knife drum on the back of the header is connected via at least two coupling systems, each of these systems comprising a lower and an upper support arm pivotally connected to the header, and with the housing of the knife drum, whereby the position of the housing remains substantially unaltered by the different height settings of the header.

8 Claims, 3 Drawing Sheets

(51) Int. Cl.
*A01D 34/835* (2006.01)
*A01D 47/00* (2006.01)

(56) References Cited

U.S. PATENT DOCUMENTS

| | | | | |
|---|---|---|---|---|
| 3,984,966 | A * | 10/1976 | Outtier | A01D 45/021 56/10.2 R |
| 4,441,307 | A * | 4/1984 | Enzmann | A01D 41/14 56/10.2 R |
| 5,107,663 | A * | 4/1992 | Wattron | A01D 34/661 56/15.7 |
| 5,433,065 | A * | 7/1995 | Mosby | A01D 41/14 56/13.9 |
| 5,725,057 | A * | 3/1998 | Taylor | A01B 35/16 172/121 |
| 6,318,055 | B1 * | 11/2001 | Bird | A01D 43/10 56/13.6 |
| 7,779,929 | B2 * | 8/2010 | Maas | A01B 45/026 172/21 |
| 7,874,135 | B2 | 1/2011 | Nagy et al. | |
| 8,171,707 | B2 * | 5/2012 | Kitchel | A01D 34/8355 56/504 |
| 2004/0006958 | A1 * | 1/2004 | Thiemann | A01D 41/141 56/10.2 R |

FOREIGN PATENT DOCUMENTS

| | | | | |
|---|---|---|---|---|
| CN | 201726680 U | * | 2/2011 | A01D 45/02 |
| CN | 202232162 U | * | 5/2012 | A01D 45/02 |
| DE | 135029 A1 | | 4/1979 | |
| DE | 3203031 A | * | 1/1982 | B60K 26/04 |
| DE | 3515295 A | * | 10/1986 | A01D 45/02 |
| DE | 102005025319 A1 | | 12/2006 | |
| EP | 212185 A1 | | 3/1987 | |
| EP | 457124 A1 | | 11/1991 | |
| EP | 1378159 A1 | | 1/2004 | |
| EP | 1483953 A1 | | 12/2004 | |
| SU | 565644 A | * | 8/1977 | A01B 33/06 |
| SU | 688153 A | * | 9/1979 | A01D 45/02 |
| SU | 973064 A | * | 11/1982 | A01D 45/02 |
| SU | 1056950 A | * | 11/1983 | A01D 45/02 |

* cited by examiner

SECONDARY CUTTING DEVICE ARRANGEMENT FOR AN AGRICULTURAL HARVESTING MACHINE

This application is the U.S. National Stage filing of International Application Serial No. PCT/EP2012/064355 filed on Jul. 20, 2012 which claims priority to Belgian Application BE2011/0466 filed Jul. 20, 2011, each of which is incorporated herein by reference in its entirety.

FIELD OF THE INVENTION

The present invention relates to agricultural machinery, in particular combine harvesters, equipped with a double cutting system for mowing crops at two different heights.

STATE OF THE ART

When harvesting grain type crop with modern combine harvesters, one can seek to harvest only the upper portion of the crops, i.e. the ears and an (as small as possible) upper part of the stems. For this purpose, during harvesting, the header is raised by means of the hydraulic lifting system at a sufficiently large height from the ground so that the front cutter blades of the header cut off the stems at a relatively great height. The disadvantage of this method is that longer stems remain in the field than with the conventional method in which the crop is harvested down to the ground. These longer stems give rise to mould when they are left in the field and are hard to plough under.

For this reason, harvesting machines have been developed with a second row of cutter blades, positioned at a height lower than that of the front cutter blades of the header and set at a distance behind these front blades, so that the remaining stalks can be mowed close to the ground. These stems can also be picked up by a pick-up mechanism of a baler and thus removed from the field.

Another way to process the remaining stems is by attaching a knife drum behind the header in order to shred the crop on the field itself. Such a drum including its housing is generally designated by the name "chopper", which will also be used further in this description. Examples of such a system are described in patent documents EP-A-0457124 and EP-A-1483953. A problem that occurs with these existing systems is that the position (i.e. the inclination angle and height with respect to the ground) of the chopper substantially changes in the event of an adjustment of the height of the header. In EP-A-0457124 a cable changes the height of the chopper as a function of the height of the header. The cutting height of the chopper is therefore not fixed. In EP-A-1483953 a hydraulic cylinder is provided to adjust the height of the chopper, but the control of it for the preservation of the cutting height at different heights header is technically complex. None of these combines has measures to maintain the inclination angle of the chopper.

MAIN FEATURES OF THE INVENTION

The invention provides a solution to the problems described above by providing a system as described in the appended claims.

In particular, the invention provides an agricultural machine that is suitable for the harvesting of grain type crops, comprising a header that is attached to the front of the machine at adjustable height, the header comprising a first cutting device whose position is determined by the adjustable height of the header, and a second cutting device, which via rollers, or equivalent support means, can move over the ground at different heights of the header, and wherein the second cutting device is connected to the back of the header via at least two coupling systems, each of these systems containing a lower and an upper support arm in such a way that the lower arm can pivot with respect to the header in a first hinge point, and with respect to the second cutting device in a second hinge point, and the upper arm can pivot with respect to the header at a third hinge point and with respect to the second cutting device in a fourth hinge point, with a fixed distance between the first and third hinge points and between the second and fourth hinge points respectively. The machine is characterized in that the coupling system is configured in such a way that the inclination angle and height of the line between the second and the fourth hinge point remains substantially unchanged with variation of the height position of the header, while the second cutting device rests on the ground.

In a conventional agricultural machine, the header is mounted on a feed system that is rotatably secured to the chassis. The preservation of the inclination angle and height can then be realized by providing for a smaller distance between the first and second hinge points than between the third and fourth hinge points. In a preferred embodiment, the distance between the first and the third hinge point is greater than the distance between the second and fourth hinge point. The resulting line between the second and fourth hinge points is inclined towards the back.

The first and the third hinge points can be located on a support beam which is connected to the back of the header, and the second and fourth hinge point on a connection plate which is connected to the second cutting device.

The second cutting device may include a knife drum rotating in a housing, in which the upper and lower arms are connected by pivots. The rollers or similar support means can then also be attached to the housing.

Preferably, the support beam is removable and connected to the header, e.g. at the top with a hook and at the bottom with a pin joint.

To enable a setting of the inclination angle of the second cutting device, one or both of the support arms may have an adjustable length. This can be achieved by providing a part of the support arm with a bushing and threaded rods of opposite thread direction. It also allows adjustment of the distance between the rear side of the chopper and the wheels of the agricultural machine.

DETAILED DESCRIPTION OF PREFERRED EMBODIMENTS

Figure 1A:
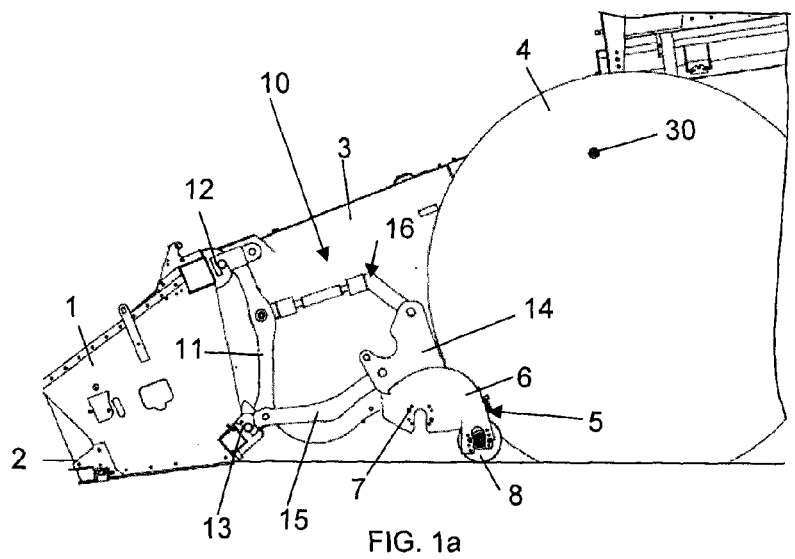
FIG. 1a shows the coupling system of the chopper to the header in a low position of the header.

FIG. 1a shows the following parts of a combine harvester comprising a lifting system according to the invention: a header 1, with a front cutting device 2 consisting of two sets of knives moving with respect to each other, driven by a gear box with rotating input shaft and an output shaft that moves back and forth (so called wobble box). In addition, it shows a feeder mechanism 3, with a front to which the header is connected, and a rear, which is connected to the frame of the combine harvester. The feeder 3 can be pivoted about a horizontal transverse axis 30 by means of a hydraulic lifting system. This lifting system is not visible on the Figure: it is located behind the front wheel 4 of the combine. The chopper 5 is attached to the back of the header. It consists of a housing 6 in which a knife drum 7 of the chopper is rotatably arranged. The knife drum is driven by a drive mechanism, e.g. a motor equipped with a belt transmission, which is located at one lateral end of the chopper. The housing 6 of the chopper rests on the ground via two or more support rollers 8 (one on each side of chopper). Alternatively, a pair of skid plates can be used to support the chopper housing 6. The components described so far can be implemented as in known machines.

Figure 1B:
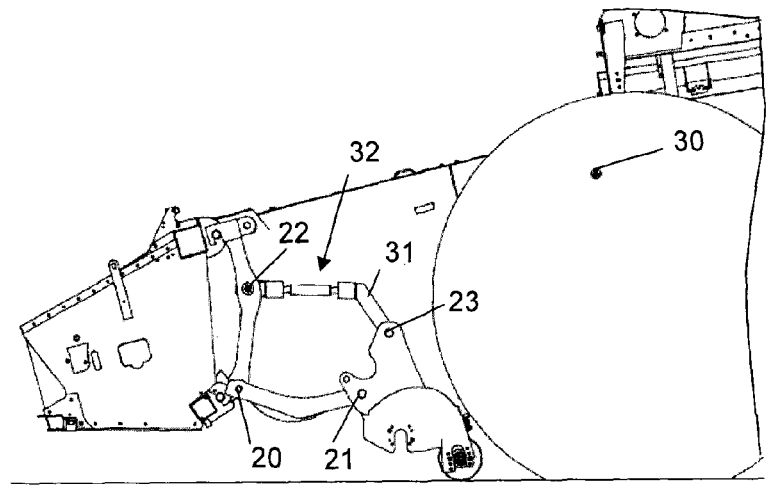
FIGS. 1b and 1c show the system in a medium and high position of the header.

The invention is characterized by the presence of a coupling system between the header 1 and the chopper 5, with the features of claim 1. A possible embodiment of such a coupling system 10 is shown in FIGS. 1a and 1b. This coupling system is installed at at least two places along the width of the header, preferably symmetrically on either side of the feeder system 3. The coupling system 10 includes an upright support beam 11 which is fixedly connected to the rear of the header (fixed in the sense of "is not movable with respect to the header"), at an upper point 12 and a lower point 13. The system further comprises a connecting plate 14, which has a fixed connection to the housing 6 of the chopper, and two support arms 15, 16. The lower support arm 15 is pivotally connected to the support beam 11 and connecting plate 14 via hinge points 20 and 21, respectively (see FIG. 1b). The upper support arm 16 is connected to the supporting beam 11 and the plate 14 via hinge points 22 and 23, respectively. The support beam 11, and/or the connection plate 14 can be made as profiles of U-shaped cross-section or double plates which are mounted between the axes of rotation which define the hinge points.

Figure 1C:
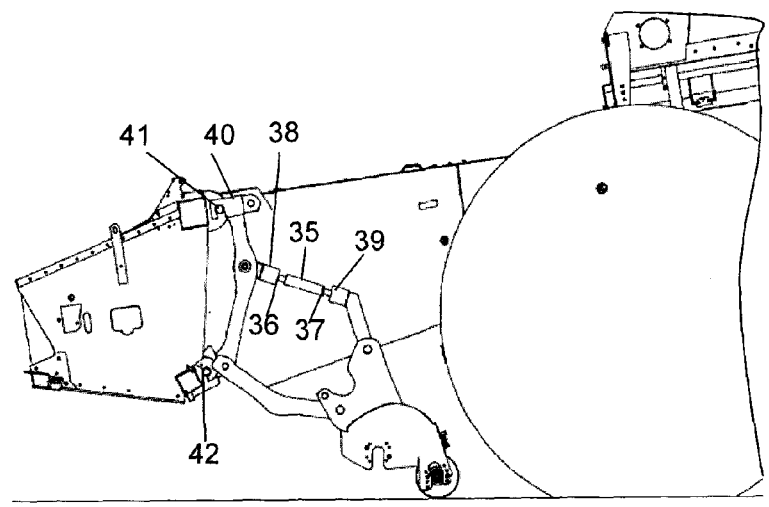
Figure 2:
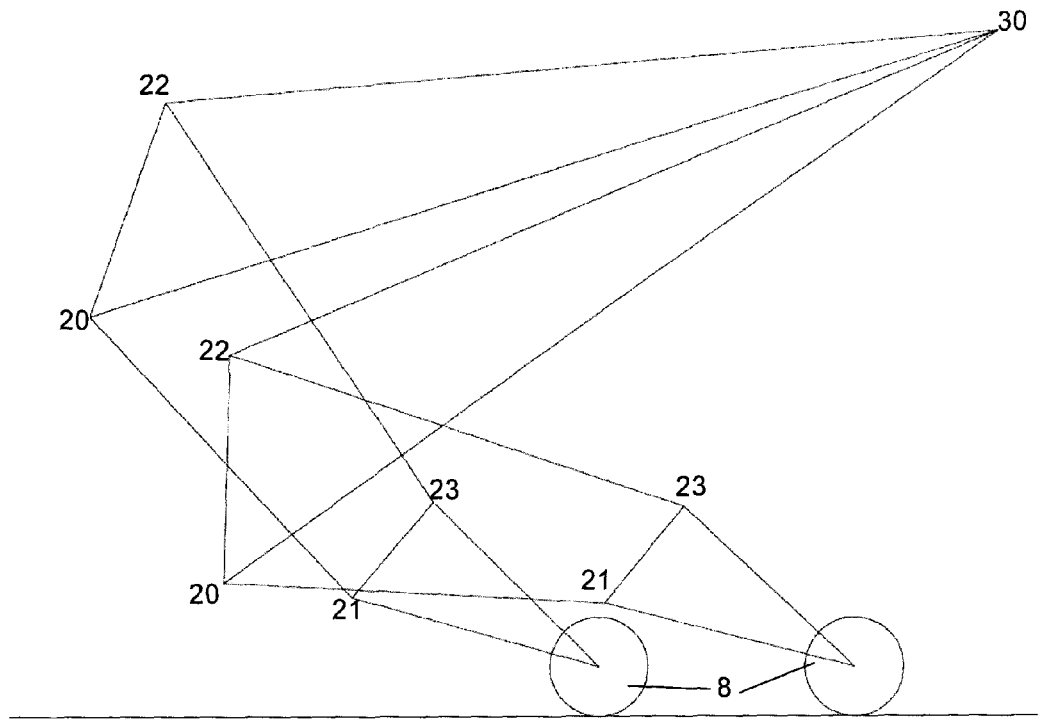
FIG. 2 shows a simplified model of the coupling system in the two positions.
Figure 3:
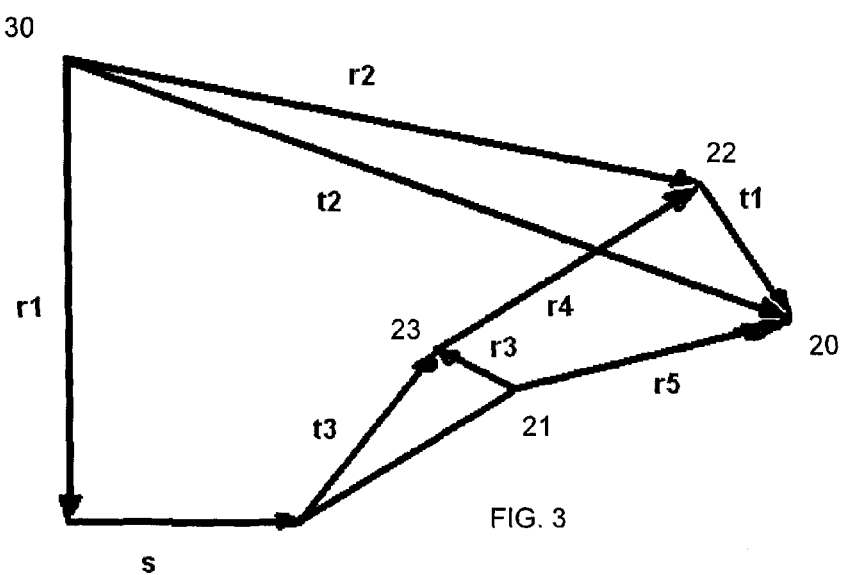
FIG. 3 shows a vectorial model of the coupling system, which serves as the basis of the calculation of the system.

The hinge points 20-23 define a four-bar linkage, with one degree of freedom. The position of the hinge points 20-23 and the mutual distances between these points are determined in such a way that, as long as the supporting roller 8 rests on the ground, the inclination angle of the line between the hinge points 21 and 23 on the connecting plate 14 substantially remains the same, regardless of the height position of the header 1. As can be seen in FIGS. 1a to 1c, the angle of the chopper with respect to the field substantially remains the same with the lifting or lowering of the header. This is even more visible in the schematic representation in FIG. 2, which shows the position of the linkage defined by the hinge points 20 to 23, at two different positions of the header. The lifting system of the header forces the header to pivot around a fixed point 30 on the chassis of the combine. According to the invention, the position of the hinge points with respect to this pivot point 30 is such that when the supporting roller 8 rests on the ground, the inclination angle and the height of the line 21-23 remain substantially constant. This calculation can be performed according to a vectorial calculation method, wherein the lifting and fastening system are represented by a set of vectors. FIG. 3 shows such vectors prior to their optimization. An iterative calculation can determine the position of the hinge points whereby the inclination angle and height of the vector r3 remain substantially constant with a variation of the inclination of vector r2.

Following optimization, a linkage is obtained in which the distance between the first hinge point 20 and the second hinge point 21 is substantially smaller than the distance between the third hinge point 22 and the fourth hinge point 23. The operational length of the lower support arm 15 is therefore smaller than the operational length of the upper support arm 16. The distance between the first hinge point 20 and the third hinge point 22 is smaller than the distance between the second hinge point 21 and fourth hinge point 23. The resulting line between the optimum hinge points 21, 23 on the side of the chopper is inclined upwards and to the rear. In the illustrated embodiment, the line between the first and third hinge point is substantially parallel to the rear wall of the header 1.

According to a possible embodiment, the upper support arm 16 is variable in length. The version shown in FIGS. 1a to 1c is an example in which the upper support arm 16 is an angle-shaped arm, with one part with a fixed length 31, which makes an angle with a section of variable length 32 (see FIG. 1b). The variable part 32 consists of a bushing 35 and threaded rods 36, 37 at each end of the bushing and are screwed on the other side in the side blocks 38 and 39 (see FIG. 1c). One thread direction of the threaded rod is opposite to that of the other. The distance between the hinge points 22 and 23 can be adjusted by turning the bushing 35. The result is a change in the inclination angle of the housing 6, and therefore of the angle at which the crop is being cut. An adjustment of the length of the support arm 16 may also be necessary when rollers 8 are used with different dimensions.

With a change in height of the header 1, the resulting angular displacement of the chopper 5 does not necessarily have to be equal to 0. A deviation up to about 5° is tolerable without significant loss of efficiency of the chopper. Such a small increase in the angle may even be advantageous in the lowest range of the header 1. This low header height is used in laid crop, when the stems can no longer be harvested efficiently. The chopper is then used to shred the plant completely so that it can be ploughed-in efficiently.

Figure 4:
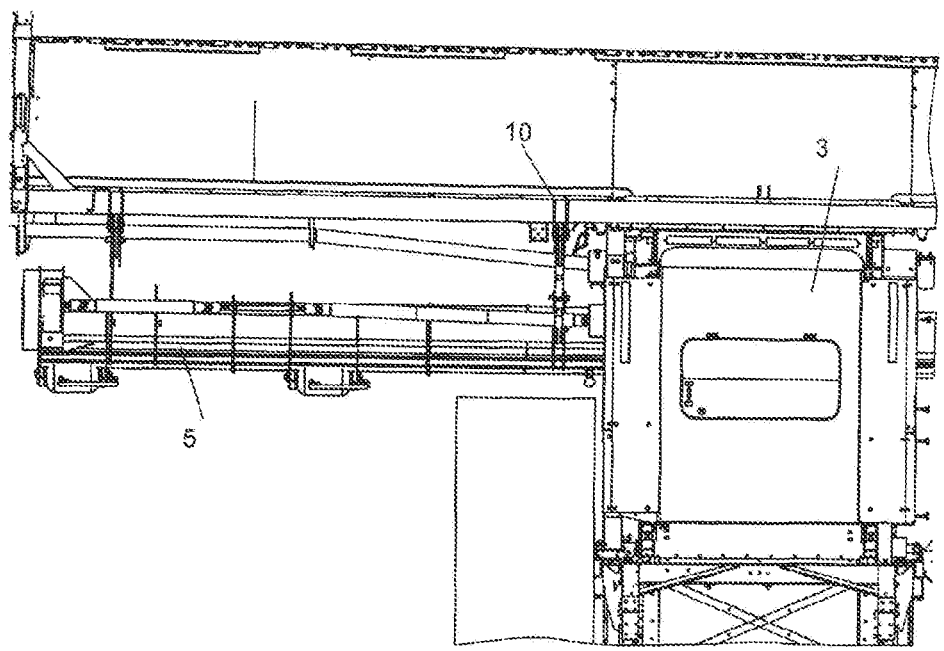
FIG. 4 shows a top view of a machine according to the invention.

FIG. 4 shows a top view of the front part of a combine harvester according to the invention. Represented are the header 1, the feeder system 3 and the chopper 5. The left coupling system 10 is also shown. In this embodiment, there is one such system symmetrically on either side of the feeder system.

Figure 5:
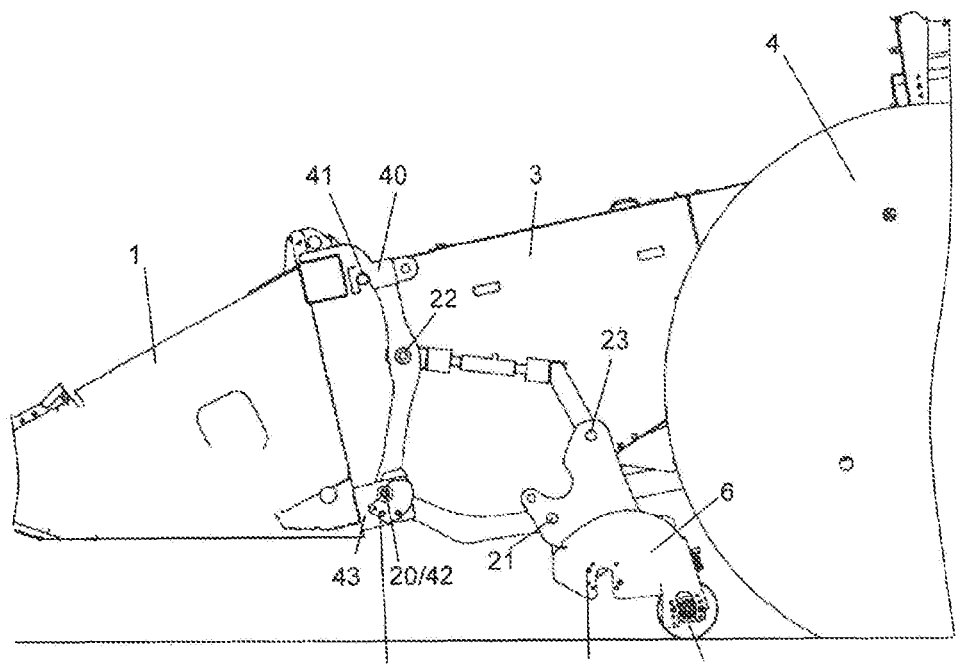
FIG. 5 shows a coupling system according to another embodiment of the invention that is equipped with a different attachment to the header.

The connection of the upright support beam 11 with the header 1 may be constructed in different ways. In the embodiment shown, the support beam can be attached via a hook 40 to a transverse pin 41 at the top of the header, and by means of a pin joint 42 with the bottom side (see FIG. 1c). Thus, this system is very easy to connect to and disconnect from the header. According to other embodiments, the support beam 11 can be permanently linked with the header, or the hinge points 20 and 22 can be attached via separate support means directly on the frame of the header itself (e.g. with triangular support elements, such as used in EP-A-1483953). Also the hinge points 21 and 23 may be located on the housing of the chopper itself rather than on a connection plate 14. FIG. 5 shows a version with a different type of attachment at the bottom of the header 1, wherein the hinge point 20 coincides with the pin joint 42. The pin is received in a rearward fork 43 on the back of the header. For easy mounting, first the hook 40 is mounted on top of the coupling system on the transverse pin 41 and then the coupling system is rotated forward until the lowest pin sits in the fork 43. The bottom connection is secured with a crescent-shaped locking piece 44.

The invention offers the advantage that the orientation and height of the knife drum 7 substantially remain constant, irrespective of the height of the header, creating a more efficient operation of the chopper.

Let it be clear that the above-described combination of the combine harvester, header, and chopper is only one embodiment of the present invention, and that modifications and adaptations are possible, without departing from the scope of the invention as defined by the appended claims. Thus, it is possible to make the length of both support arms adjustable. This makes it possible to adjust the distance between the chopper and the front wheels of the combine.

The invention claimed is:

1. An agricultural machine operable for the harvesting of grain type crops, comprising:
    a header, secured to a feeder system which is rotatably attached to the chassis of the agricultural machine about a horizontal axis for adjusting a height of the header, the header comprising a first cutting device the position of which is dependent on the height of the header, and a second cutting device which rests on and can move over the ground at different heights of the header, and
    wherein the second cutting device is connected to the back of the header via at least two coupling systems, wherein each of these systems contains a lower and an upper support arm, the lower and upper support arms being arranged such that, during rotation of the feeder system about the horizontal axis:
        the lower arm can pivot with respect to the header at a first hinge point, and with respect to the second cutting device at a second hinge point;
        the upper arm can pivot with respect to the header at a third hinge point and with respect to the second cutting device at a fourth hinge point;
        a distance between the first and second hinge points being smaller than a distance between the third and fourth hinge points; and
        fixed distances between the first and third hinge points and between the second and fourth hinge points respectively, the fixed distance between the first and the third hinge points being greater than the fixed distance between the second and fourth hinge points, such that an inclination angle and height of a line defined between the second and the fourth hinge points remains substantially unchanged with variation of the height position of the header, while the second cutting device rests on the ground.

2. An agricultural machine according to claim 1, wherein the line between the second and fourth hinge points is inclined upwards and to the rear.

3. An agricultural machine according to claim 1, wherein the line between the first and the third hinge points is substantially parallel to the rear wall of the header.

4. An agricultural machine according to claim 1, wherein:
    the second cutting device comprises a knife drum, which is rotatably mounted in a housing that can move over the ground at different heights of the header,
    the lower arm in the second hinge point is connected by pivots to the housing of the knife drum; and
    the upper arm in the fourth hinge point is connected by pivots to the housing of the knife drum.

5. An agricultural machine according to claim 4, wherein the first and third hinge points are located on a support beam which is connected to the back of the header between an upper point of the header and a lower point of the header, and wherein the second and fourth hinge points are located on a connecting plate which is fixedly connected to the housing of the knife drum.

6. An agricultural machine according to claim 5, wherein the support beam at the upper point is connected with the header via a disconnectable hook-type connection, and at the lower point via a disconnectable pin joint.

7. An agricultural machine according to claim 1, wherein at least one of the lower and upper support arms is of a variable adjustable length.

8. An agricultural machine according to claim 7, wherein at least one of the lower and upper support arms contains a part which comprises a bushing and two threaded rods with opposite thread directions.

* * * * *